US006857323B1

(12) United States Patent
Shajii et al.

(10) Patent No.: US 6,857,323 B1
(45) Date of Patent: Feb. 22, 2005

(54) TWO PHASE FLOW SENSOR USING TOMOGRAPHY TECHNIQUES

(75) Inventors: Ali Shajii, Canton, MA (US); Siddharth P. Nagarkatti, Acton, MA (US); John A. Smith, Andover, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 10/669,065

(22) Filed: Sep. 23, 2003

(51) Int. Cl.[7] ............................................. G01F 1/74
(52) U.S. Cl. ........................................... 73/861.04
(58) Field of Search ..................... 73/861.27, 861.25, 73/861.26, 861.31, 40.5, 861.63, 861.04; 378/4

(56) References Cited

U.S. PATENT DOCUMENTS

| | | | | |
|---|---|---|---|---|
| 6,546,811 B2 | * | 4/2003 | Fincke | 73/861.63 |
| 6,550,345 B1 | * | 4/2003 | Letton | 73/861.27 |
| 6,577,700 B1 | * | 6/2003 | Fan et al. | 378/4 |
| 6,668,619 B2 | * | 12/2003 | Yang et al. | 73/40.5 R |

OTHER PUBLICATIONS

Zhiyao Huang et al., "Application of Electrical Capicitance Tomography to the Void Fraction Measurement of Two–Phase Flow", *IEEE Transactions on Instrumentation and Measurement*, vol. 52, No. 1, Feb. 2003, pp. 7–12.

Kjetll Ullaland, "The Design of a VLSI Mixed Analogue and Digital Modular ASIC Processor for Capacitance Tomography", Oct. 1994, University of Bergen, Bergen, Norway, pp. 4.1–4.6.

* cited by examiner

*Primary Examiner*—Edward Lefkowitz
*Assistant Examiner*—Jewel V. Thompson
(74) *Attorney, Agent, or Firm*—McDermott Will & Emery LLP

(57) ABSTRACT

A method and system is presented for accurately measuring the two phase flow rate of a fluid mixture that includes two different phase components. Capacitance tomography measurements are made in order to determine the concentration ratio of the different phase components within the fluid. Approximate flow measurements are made by transmitting, for example, ultrasound waves through the fluid mixture, and measuring the different speeds of propagation of the ultrasound waves through the different phase components of the fluid mixture. The exact flow rate of the fluid mixture is determined using the concentration ratio obtained from the tomographic measurements, and the approximate flow measurements made, for example, by ultrasound sensing.

26 Claims, 3 Drawing Sheets

TWO PHASE FLOW SENSOR USING TOMOGRAPHY TECHNIQUES

FIELD OF THE INVENTION

The present invention relates to flow sensors. In particular, the present invention relates to two phase flow sensors that use tomography techniques.

BACKGROUND

Flow sensors measure the quantity or rate of fluid flowing through a given cross-sectional area over a given time interval. In particular, a two phase flow sensor measures the quantity or rate of fluid flow for a fluid mixture that includes two different phase components (e.g., gas/liquid, liquid/solid, solid/gas, etc.). Examples of two phase flow measurements include, but are not limited to: bubble flow, wavy flow, slug flow, annular flow, and slurry flow.

Two phase flow measurements have widespread applications in many industries, including the semiconductor industry. For the semiconductor industry, in particular, the measurement of slurry flow is an area of particular interest. A slurry is a specialized solution that contains free abrasives, and is used for chemical-mechanical polishing of wafers. An accurate flow measurement is necessary for control of slurry flow.

When the flowing medium contains more than one phase component, a gas and a liquid by way of example, the gas-to-liquid ratio may be unknown, and may change slowly over time. In this case, an exact knowledge of the mixing ratio and the properties of the components of the fluid mixture is needed. However, at present there is a lack of flow sensors that can dynamically incorporate the properties of the components of a multi-component fluid mixture, for two phase flow. Using conventional flow sensors, it is necessary to perform separate calibrations each time the ratio of the phases in the fluid mixture changes.

It is therefore desirable to provide a method and system for measuring two phase flow that allows the ratio of the different constituent phases in the fluid mixture to be determined, thereby allowing for an accurate measurement of the two phase flow rate.

SUMMARY

The present invention features the use of tomography techniques to obtain an accurate measurement of two phase fluid flow. In particular, tomography measurements are made in order to determine the concentration ratio of the different phase components (e.g., gas/liquid, gas/solid, or liquid/solid) of the two phase flow. Ultrasound measurements (or measurements using pressure waves or thermal waves) are made to determine approximate flow rates for the two phase flow, using the difference in the speed of propagation of sound within the different phase components of the fluid mixtures. The tomography measurements and the ultrasound measurements can be combined to provide an accurate two phase flow rate of the fluid mixture.

A system is provided for measuring a two phase flow rate of a fluid mixture that flows through a tubular vessel. The fluid mixture contains at least a first component characterized by a first phase, and a second component characterized by a second phase. The system includes a tomography unit for determining the concentration ratio between the first phase component and the second phase component. The system includes a first sensor for providing a first approximate flow measurement for the fluid mixture, and a second sensor disposed at a known orientation relative to the first sensor, for providing a second approximate flow measurement for the fluid mixture. In one embodiment, the first and second sensors are, preferably, ultrasound sensors.

The system includes a processor for computing the actual two phase flow rate of the fluid mixture using the concentration ratio, and the first and second flow measurements. The two phase flow rate is related to the concentration ratio and to the first and second flow measurements by a known relationship. In one embodiment, the first and second sensors include an ultrasound transmitter for transmitting an ultrasound wave through the fluid mixture, and an ultrasound receiver for detecting the transmitted ultrasound wave. In one embodiment, the direction of propagation of said first ultrasonic wave makes an angle $[\pi/2-\theta]$ with respect to the direction of flow of the fluid mixture, and the direction of propagation of the second ultrasonic wave makes an angle $[\pi/2+\theta]$ with respect to the direction of flow of the fluid mixture.

In this embodiment, the known relationship between the actual flow rate and the approximate flow rates is given by:

$$v = \frac{\sin(\theta)}{2} \cdot (u_1 - u_2),$$

where
v is the two phase flow rate of the fluid mixture;
$u_1$ is the first approximate flow rate; and
$u_2$ is said second approximate flow rate.
In this embodiment, the first approximate flow rate $u_1$ is given by:

$$u_1 = c_{mix} + \frac{1}{\sin(\theta)} v;$$

and the second approximate flow rate $u_2$ is given by:

$$u_2 = c_{mix} - \frac{1}{\sin(\theta)} v;$$

where $c_{mix}$ is the speed of sound within the fluid mixture, and is given by $$c_{mix} = c_{first} \cdot \rho + c_{second} \cdot (1-\rho)$$

where
$c_{first}$ is the speed of sound within the first fluid component,
$c_{second}$ is the speed of sound within the second fluid component, and
$\pi$ is the tomographically measured concentration ratio of the first and second fluid components.

A method is provided for determining a two phase flow rate of a fluid mixture through a vessel, the fluid mixture including at least a first fluid component characterized by a first phase and a second fluid component characterized by a second phase. The method includes performing a tomography measurement of the fluid mixture flowing through the vessel, so as to determine a concentration ratio ρ between the first and second phase components within the mixture. The method includes obtaining a first flow measurement and a second flow measurement, by using a first and a second transducer sensor (in one embodiment, preferably ultrasound sensors) to transmit waves through the fluid mixture and detect the transmitted waves. The method includes computing the two phase flow rate of the fluid mixture as a known function of the ratio ρ, the first and second approximate flow measurements, and the direction and speed of transmission of the waves.

DESCRIPTION

The present invention is directed to a two phase flow sensor, for accurately measuring the two phase flow rate of the fluid mixture containing at least a first fluid phase component, and a second fluid phase component. Tomography measurements are performed in order to determine the ratio of the different phase components of the fluid mixture. A pair of approximate flow measurements are made by transmitting waves (e.g. ultrasound waves or pressure waves) through the fluid mixture. The approximate two phase flow rates are determined using the measured speed and direction of propagation of the waves. The actual two phase flow rate can then be determined, as a function of the concentration ratio obtained by tomography measurements, and the approximate two phase flow rates.

Figure 1:
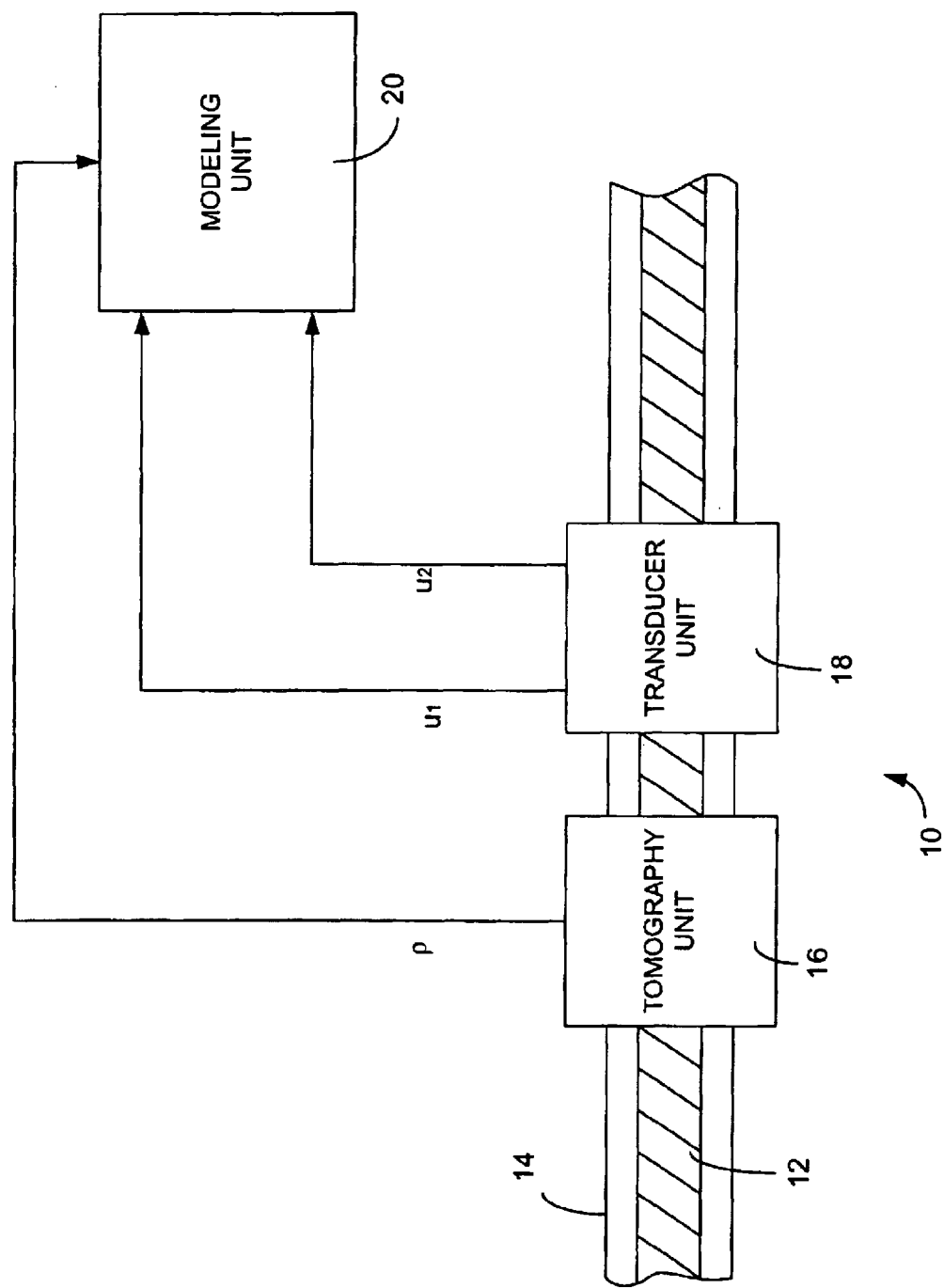
FIG. 1 illustrates a block diagram of a flow sensor, constructed in accordance with one embodiment of the present invention.

FIG. 1 illustrates an overall schematic block diagram of a flow sensor 10, constructed in accordance with one embodiment of the present invention, for measuring the two phase flow of a fluid mixture 12 flowing through a vessel 14. The fluid mixture 12 contains at least two different phase components. Preferably, the fluid mixture contains a first fluid component characterized by a first phase (e.g., gas), and a second fluid component characterized by a second phase (e.g., liquid). The first phase and the second phase may be any one of a gas, a liquid, and a solid. For example, the fluid mixture 12 for two phase flow may include, but is not limited to, bubble flow (air bubbles in water—gas/liquid), oil/gas (gas/solid) mixtures (found for example in fluidized beds), and oil/liquid mixtures.

In overview, the flow sensor 10 in the illustrated preferred embodiment includes a tomography unit 16, a transducer unit 18, and a modeling unit 20. The tomography unit 16 makes a tomography measurement of the fluid mixture 12, to determine the concentration ratio ρ between the first phase component and the second phase component. The transducer unit 18 determines at least two approximate values (referred to in FIG. 1 and FIG. 2 as $u_1$ and $u_2$) of flow measurements for the two phase fluid mixture 12, by transmitting waves (including but not limited to ultrasound waves, pressure waves, or thermal waves) through the fluid mixture 12, and measuring the speed and direction of propagation of the waves through the two phase fluid mixture 12. The modeling unit 20 computes an actual two phase flow rate v, using the concentration ratio ρ obtained from the tomography unit 16, and the approximate flow measurements $u_1$ and $u_2$ obtained from the transducer unit 18.

Tomography systems are useful for obtaining an image of a cross-section of an object. In particular, tomography systems have been used to monitor two phase fluid mixtures (e.g., oil/gas mixtures or oil/liquid mixtures). In a preferred embodiment, the tomography unit 16 is a capacitance-based tomography system, typically referred to in the art as an ECT (Electrical Capacitance Tomography) system. As known in the art, ECT systems are useful for obtaining information about the spatial distribution of a mixture of dielectric materials inside a vessel. ECT is a technique for measuring and displaying the permittivity distribution of a mixture of dielectric fluids inside a closed pipe or vessel. When just two materials are present, ECT can be used to measure the concentration distribution of the fluid mixture. In the present invention, the tomography unit 16 is preferably an ECT system that can be used to obtain information regarding the spatial distribution or concentration ratio of the first phase component to the second phase component. Commercially available ECT systems, known and used in the art, may be used.

In a preferred embodiment of the invention, the tomography unit 16 is a capacitance-based system that includes sets of electrodes (i.e., electric sensors) that are mounted circumferentially around a pipe. The electrical capacitances between the sets of electrodes (placed around the periphery of the vessel 14) are measured, and the data are converted into an image that shows the distribution within the vessel 14 of the dielectric permittivity. Typically, a reconstruction algorithm is applied to the data in order to find the dielectric permittivity distribution within the vessel 14. When the vessel contains a mixture of different dielectric materials, as in the present invention, such a dielectric permittivity distribution corresponds to the concentration distribution. For example, in the case of a gas/liquid mixture, the gas-to-liquid concentration ratio can be defined as:

$$\rho = \left(\frac{\text{Liquid} - \text{Gas}}{\text{Liquid}}\right) \quad (1)$$

The transducer unit 18 includes at least two transducer sensors, and provides a first approximate flow measurement $u_1$ from the first sensor, and a second approximate flow measurement $u_2$ from the second sensor. In a preferred embodiment, the transducer sensors are ultrasound sensors for measuring the velocity of ultrasound waves that propagate through the vessel. In other embodiments, however, other types of transducer sensors (including but not limited to pressure sensors and thermal sensors) may also be used without departing from the scope of the present invention. The modeling unit 20 is preferably a multi-processor computer, and computes the actual two phase flow rate, using as input the concentration ratio ρ obtained from the tomography unit 16, and the first and second approximate flow measurements.

Figure 2:
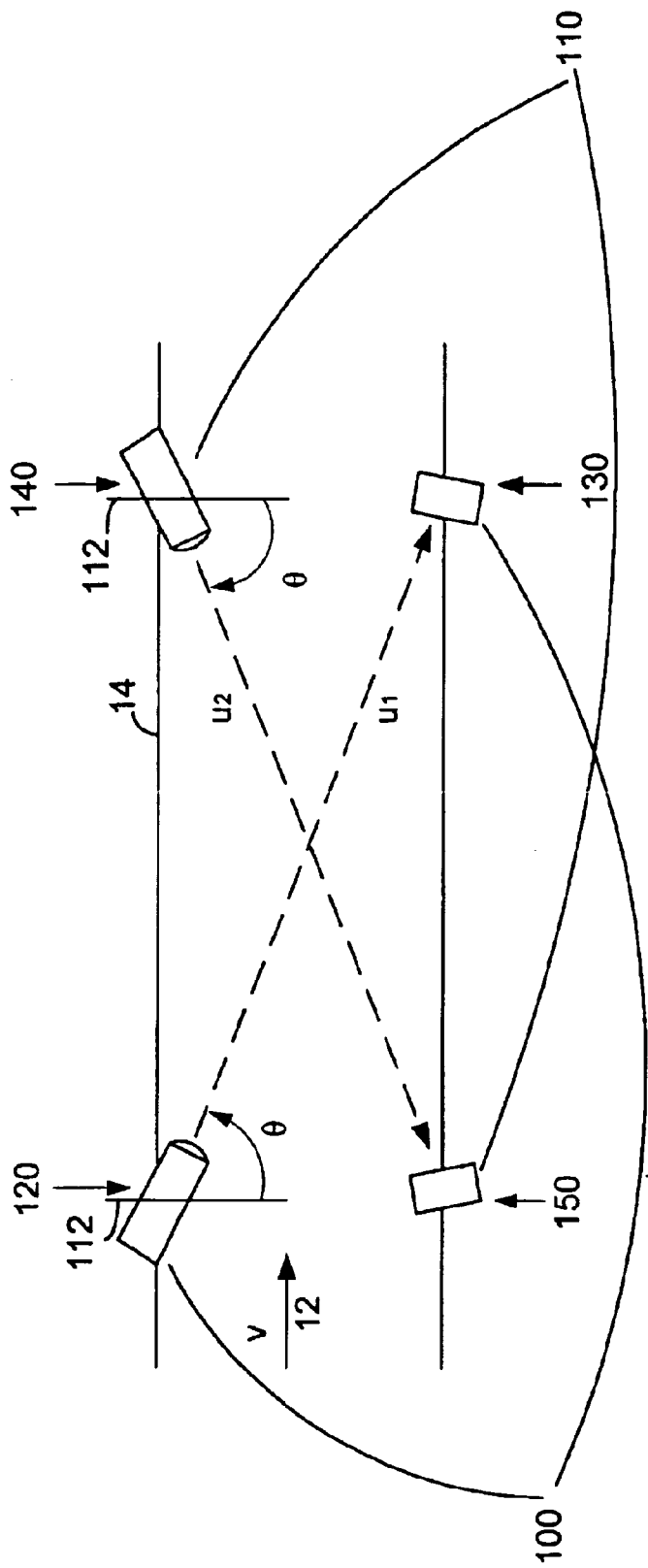
FIG. 2 illustrates first and second flow measurements, obtained by transmitting first and second ultrasonic waves through the fluid mixture.

FIG. 2 diagrammatically illustrates first and second approximate flow measurements $u_1$ and $u_2$, determined by transmitting first and second waves through the fluid mixture 12. In the illustrated preferred embodiment, the first and second waves are ultrasound waves. The flow measurements $u_1$ and $u_2$ are approximate, and do not exactly equal the flow rate of the mixture, because the speed of sound in the fluid mixture 12 varies with the composition of the mixture. A first ultrasound sensor 100 is used to obtain the first approximate flow measurement $u_1$, and a second ultrasound sensor 110 is used to obtain the second approximate flow measurement $u_2$. These two measurements are required in order to compute the actual flow rate v of the fluid mixture 12. In the illustrated embodiment, the flow measurement $u_1$ is measured in the same direction as the fluid flow, and $u_2$ is measured in the opposite direction of flow.

Using the composition of the fluid mixture 12, as captured by equation (1) in paragraph 14, the speed of sound in the fluid mixture 12 can be determined by the following expression:

$$c_{mix} = c_1 \cdot \rho + c_2 \cdot (1-\rho), \quad (2)$$

where $c_{mix}$ is the speed of sound in the fluid mixture 12, $c_1$ is the speed of sound in the first phase component of the mixture 12, $c_2$ is the speed of sound in the second phase component of the mixture 12, and $\rho$ is the concentration ratio obtained from tomography measurements.

The first ultrasound sensor 100 includes a first ultrasound transmitter 120 for transmitting a first ultrasound wave through the fluid mixture 12, and a first ultrasound receiver 130 for detecting the transmitted ultrasound wave. The second ultrasound sensor 110 includes a second ultrasound transmitter 140 for transmitting a second ultrasound wave through the fluid mixture 12, and a second ultrasound receiver 150 for detecting the transmitted ultrasound wave. Commercially available ultrasound transmitters and receivers, known in the art, may be used.

As seen from FIG. 2, the ultrasound transmitters 120 and 140, and the ultrasound receivers 130 and 150, are placed on a periphery of the vessel 14. The smallest angle subtended by the ultrasound transmitters 120 and 140 to the vertical (i.e. an axis 112 normal to the outer surface of the vessel) is indicated as $\theta$ in FIG. 2. In this embodiment, the direction of propagation of the first ultrasonic wave makes an angle $[\pi/2-\theta]$ with respect to the direction of flow of the fluid mixture 12. The direction of flow of the second ultrasonic wave makes an angle $[\pi/2+\theta]$ with respect to the direction of low of the fluid mixture.

In this exemplary configuration, the approximate flow rates $u_1$ and $u_2$ are determined as follows:

$$u_1 = c_{mix} + \frac{1}{\sin(\theta)} v, \quad (3)$$

$$u_2 = c_{mix} - \frac{1}{\sin(\theta)} v,$$

where $c_{mix}$ is the speed of sound in the fluid mixture 12, $v$ is the actual flow rate of the fluid mixture 12, and $\theta$ is the smallest angle subtended by the ultrasound transmitters with the vertical.

From equation (3) above, the two phase flow rate of the fluid mixture can be solved for as follows:

$$v = \frac{\sin(\theta)}{2} \cdot (u_1 - u_2) \quad (4)$$

Figure 3:
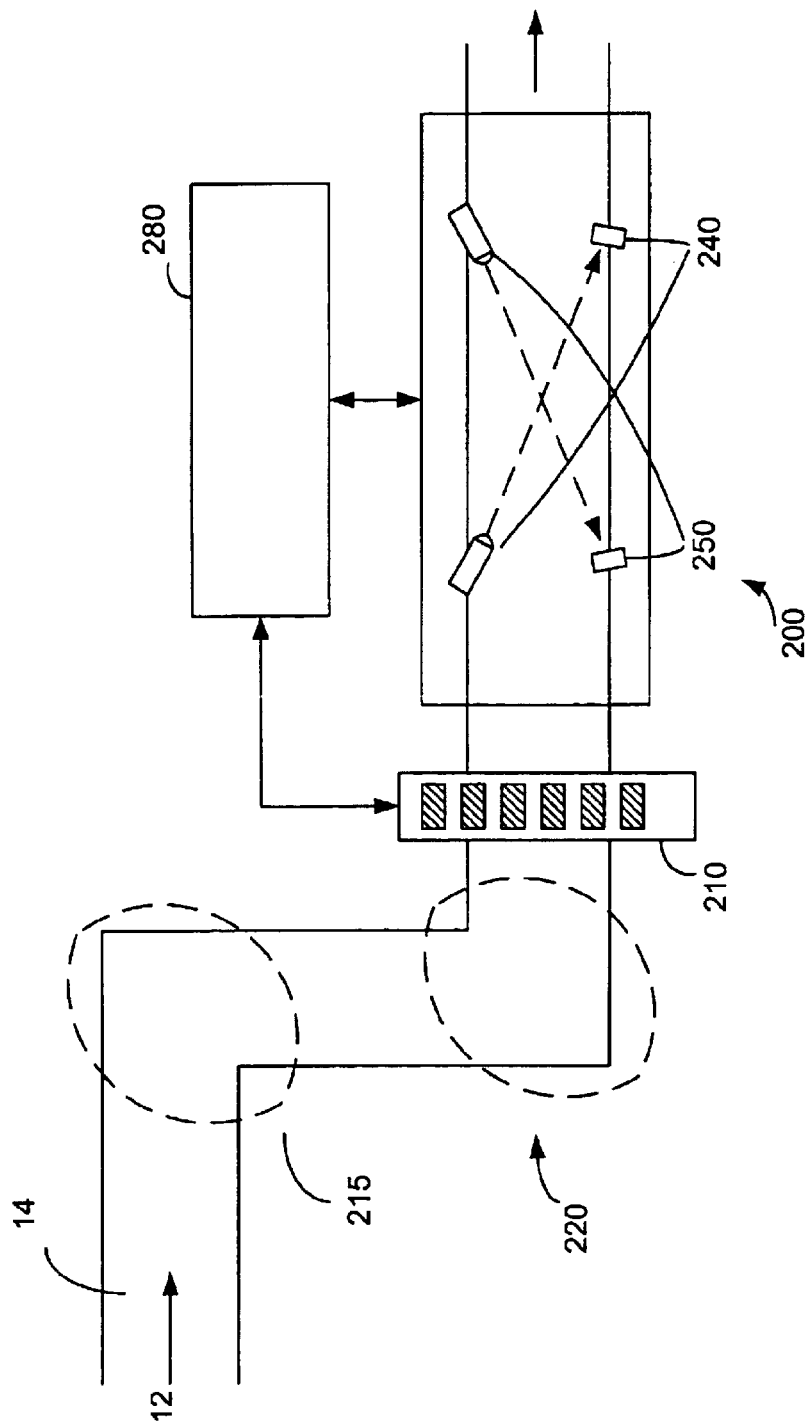
FIG. 3 illustrates the arrangement of the components of a flow sensor, constructed in accordance with one embodiment of the present invention.

FIG. 3 illustrates an arrangement of the components of a flow sensor 200, constructed in accordance with the present invention. In order to obtain results that are as accurate as possible, it is preferred that the fluid mixture 12 be as homogeneous as possible. Improving the homogeneity of the fluid mixture can be achieved in a number of ways. For example, an agitator or screen can be used. In the embodiment illustrated in FIG. 3, bends 215 and 220 are introduced in the piping of the vessel 14, in order to improve the homogeneity of the fluid mixture 12 flowing through the vessel 14.

As seen from FIG. 3, the flow sensor 200 includes an ECT sensor 210. The homogenized fluid mixture 12 passes through the ECT sensor 210, which determines the concentration ratio of the fluid mixture. As explained earlier, the ECT sensor 210 includes a number N of electrodes arranged circumferentially. Typically, the ECT sensor 210 provides an image of the dielectric components of the fluid mixture 12 inside the sensor 210, by performing a number of steps. First, a sensitivity map of the sensor is calculated. The sensitivity map is a numerical matrix whose elements correspond to the individual pixels in a rectangular grid, which is superimposed on the sensor area. This map describes how the measured capacitance between any combination of electrodes changes, when a change is made to the dielectric constant of a pixel inside the sensor. The sensor 210 is then calibrated at each end of the range of dielectric permittivities to be measure. After calibration, the measurements of electric capacitances begin. The capacitances between all unique pairs of sensor electrodes are measured continuously at high speed, giving $N(N-1)/2$ unique values per measurement. The cross-sectional distribution of the permittivity of the material inside the pipe from the capacitance measurements is then calculated, using one or more image reconstruction algorithms known in the art, including but not limited to a back-projection algorithm.

The two phase flow sensor 200 further includes a first ultrasound sensor 240, and a second ultrasound sensor 250. As described in paragraph [21], these sensors provide first and second approximate flow measurements, by measuring the speed and direction of propagation of ultrasound waves through the fluid mixture 12. The two phase flow sensor 200 further includes an electronic processor 280. The processor 280 computes the desired two phase flow rate $v$ of the fluid mixture 12, using the concentration ratio obtained from the ECT sensor 210, and the first and second flow measurements provided by the ultrasound sensors 240 and 250, and the relationship provided by equation (4).

Using the two phase flow sensor as featured in the present invention, it is possible to accurately determine the two phase flow rate of a fluid mixture in a manner that dynamically incorporates the properties of the components of the fluid mixture. Separate calibrations of the flow sensor are not longer required, when the ratio of the different phase components in the fluid mixture changes.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for determining a two phase flow rate of a fluid mixture through a vessel, said fluid mixture comprising at least a first fluid component characterized by a first phase and a second fluid component characterized by a second phase, the method comprising:

A. performing a tomography measurement of said fluid mixture flowing through said vessel so as to determine a ratio $\rho$ between said first component and said second component within said fluid mixture;

B. obtaining a first approximate flow measurement and a second approximate flow measurement by using a first and a second transducer sensor to transmit a wave through said fluid mixture and detect the transmitted wave; and C. computing said two phase flow rate of said fluid mixture as a known function of said ratio $\rho$, said first and second flow measurements, and the direction and speed of transmission of said wave.

2. A method in accordance with claim 1, wherein said tomography measurement comprises an ECT (Electrical Capacitance Tomography) measurement.

3. A method in accordance with claim 1, wherein the step of determining said ratio of said first component to said second component comprises the step of measuring a distribution of dielectric permittivity within said vessel.

4. A method in accordance with claim 3, wherein the step of measuring a distribution of dielectric permittivity within said vessel comprises measuring the electrical capacitances between one or more pairs of electrodes placed around the periphery of a capacitance tomography unit.

5. A method in accordance with claim 1, wherein at least one transducer sensor comprises an ultrasound sensor, and wherein said wave comprises an ultrasound wave.

6. A method in accordance with claim 1, wherein said at least one transducer sensor comprises:
   a) a first ultrasound sensor for providing said first flow measurement, and
   b) a second ultrasound sensor for providing said second flow measurement, and
   wherein said wave comprises a first ultrasound wave propagating at an angle with respect to the direction of flow of said fluid mixture, and a second ultrasound wave propagating at another angle with respect to the direction of flow of said fluid mixture.

7. A method in accordance with claim 6, wherein said first ultrasound sensor comprises a first ultrasound transmitter for generating said first ultrasound wave and transmitting it through said fluid mixture, and a first ultrasound receiver for receiving said transmitted ultrasound wave; and
   wherein said second ultrasound sensor comprises a second ultrasound transmitter for generating said second ultrasound wave and transmitting it through said fluid mixture, and a second ultrasound receiver for receiving said transmitted ultrasound wave.

8. A method in accordance with claim 1, wherein said transducer sensor comprises a pressure sensor, and said wave comprises a pressure wave.

9. A method in accordance with claim 1, wherein said vessel is characterized by a tubular configuration, and wherein transducer sensor is disposed on the surface of said vessel.

10. A method in accordance with claim 1, wherein said transducer sensor comprises a thermal sensor, and said wave comprises a thermal wave.

11. A method for determining a two phase flow rate of a fluid mixture through a vessel, said fluid mixture comprising at least a first fluid component characterized by a first phase and a second fluid component characterized by a second phase, the method comprising:
   A. performing a tomography measurement of said fluid mixture flowing through said vessel, so as to determine a concentration ratio $\rho$ of said first component to said second component in said fluid mixture;
   B. transmitting a first ultrasonic wave through said fluid mixture, and measuring the speed and direction of progagation of said first ultrasonic wave;
   C. transmitting a second ultrasonic wave through said fluid mixture, and measuring the speed and direction of progagation of said second ultrasonic wave; and
   D. computing said two phase flow rate of said fluid mixture using a known relationship between said two phase flow rate, said ratio $\rho$, and said speed and direction of propagation of each ultrasonic wave relative to the direction of flow of said fluid mixture.

12. A method in accordance with claim 11, wherein the direction of propagation of said first ultrasonic wave makes an angle $[\pi/2-\theta]$ with respect to the direction of flow of said fluid mixture;
   wherein the direction of propagation of said second ultrasonic wave makes an angle $[\pi/2+74]$ with respect to the direction of flow of said fluid mixture; and wherein said known relationship is given by:

$$v = \frac{\sin(\theta)}{2} \cdot (u_1 - u_2)$$

where v is said two phase flow rate of said fluid mixture;
$u_1$ is said first approximate flow rate; and
$u_2$ is said second approximate flow rate.

13. A method in accordance with claim 12,
wherein said first approximate flow rate $u_1$ is given by:

$$u_1 = c_{mix} + \frac{1}{\sin(\theta)} v;$$

further wherein said second approximate flow rate $u_2$ is given by:

$$u_2 = c_{mix} - \frac{1}{\sin(\theta)} v;$$

further wherein $c_{mix}$ is the speed of sound within the fluid mixture, and is given by:

$$c_{mix} = c_{first} \cdot \rho + c_{second} \cdot (1-\rho),$$

where $c_{first}$ is the speed of sound within said first fluid component,
$c_{second}$ is the speed of sound within said second fluid component,
and $\rho$ is said concentration ratio of said first component to said second component.

14. A method in accordance with claim 11, wherein each of said first and second phases comprises at least one of: a solid; a liquid; and a gas.

15. A system for measuring a two phase flow rate of a fluid mixture flowing through a vessel, said fluid mixture containing at least a first component characterized by a first phase, and a second component characterized by a second phase, the system comprising:
   A. a tomography system for determining the concentration ratio between said first component and said second component within said fluid mixture;
   B. a first sensor for providing a first approximate flow measurement for said fluid mixture;
   C. a second sensor disposed at a known orientation relative to said first sensor, for providing a second flow measurement for said fluid mixture; and
   D. a processor for computing the two phase flow rate of said fluid mixture using said concentration ratio, said first flow measurement, and said second flow measurement;
   wherein said two phase flow rate is related to said concentration ratio and to said first and second flow measurements by a known relationship.

16. A system in accordance with claim 15, wherein said first and second sensors each comprise:
   a. a transmitter for transmitting a wave through said fluid mixture; and b. a receiver for detecting said transmitted wave.

17. A system in accordance with claim 16, wherein said two phase flow rate is a function of the direction and speed of transmission of said energy.

18. A system in accordance with claim 15, wherein said first and said second sensors comprise at least one of: an ultrasound sensor; a pressure sensor; and a thermal sensor.

19. A system in accordance with claim 16, wherein said energy comprises at least one of: a) an ultrasound wave; b) a pressure wave; and c) a thermal wave.

20. A system in accordance with claim 15, wherein
   a) said first sensor comprises a first ultrasound sensor for providing said first flow measurement;
   b) said second sensor comprises a second ultrasound sensor for providing said second flow measurement; and
   wherein said energy comprises a first ultrasound wave propagating at an angle with respect to the direction of flow of said fluid mixture, and a second ultrasound wave propagating at another angle with respect to the direction of flow of said fluid mixture.

21. A system in accordance with claim 20, wherein the direction of propagation of said first ultrasonic wave makes an angle $[\pi/2-\theta]$ with respect to the direction of flow of said fluid mixture;
   wherein the direction of propagation of said second ultrasonic wave makes an angle $[\pi/2+\theta]$ with respect to the direction of flow of said fluid mixture; and
   wherein said known relationship is given by:

$$v = \frac{\sin(\theta)}{2} \cdot (u_1 - u_2),$$

where
   v is said two phase flow rate of said fluid mixture;
   $u_1$ is said first approximate flow rate; and
   $u_2$ is said second approximate flow rate.

22. A system in accordance with claim 21, wherein said first approximate flow rate $u_1$ is given by:

$$u_1 = c_{mix} + \frac{1}{\sin(\theta)} v;$$

further wherein said second approximate flow rate $u_2$ is given by:

$$u_2 = c_{mix} - \frac{1}{\sin(\theta)} v;$$

further wherein $c_{mix}$ is the speed of sound within the fluid mixture, and is given by:

$$c_{mix} = c_{first} \cdot \rho + c_{second} \cdot (1-\rho),$$

where
$c_{first}$ is the speed of sound within said first fluid component,
$c_{second}$ is the speed of sound within said second fluid component,
and $\rho$ is said concentration ratio of said first component to said second component.

23. A system in accordance with claim 20, wherein said first and second ultrasound sensor each comprises: an ultrasound transmitter for generating an ultrasound wave and transmitting it through said fluid mixture, and an ultrasound receiver for receiving said ultrasound wave.

24. A system in accordance with claim 15, wherein said tomography system comprises an ECT (Electrical Capacitance Tomography) system for providing a distribution of dielectric permittivity within said vessel by measuring the electrical capacitances between one or more pairs of electrodes placed around said vessel.

25. A system in accordance with claim 15, wherein said vessel is characterized by a tubular configuration.

26. A system in accordance with claim 15, wherein said vessel includes at least one bend.

* * * * *